(12) United States Patent
Hradisky et al.

(10) Patent No.: US 11,992,142 B2
(45) Date of Patent: May 28, 2024

(54) NO-DIG MAILBOX

(71) Applicant: THE SIMPLAY3 COMPANY, Streetsboro, OH (US)

(72) Inventors: John Hradisky, Aurora, OH (US); Keary Knerem, Garrettsville, OH (US)

(73) Assignee: THE SIMPLAY3 COMPANY, Streetsboro, OH (US)

( * ) Notice: Subject to any disclaimer, the term of this patent is extended or adjusted under 35 U.S.C. 154(b) by 763 days.

(21) Appl. No.: 16/949,931

(22) Filed: Nov. 20, 2020

(65) Prior Publication Data

US 2021/0153678 A1 May 27, 2021

Related U.S. Application Data

(60) Provisional application No. 62/939,362, filed on Nov. 22, 2019.

(51) Int. Cl.
*A47G 29/12* (2006.01)
*F16M 11/22* (2006.01)

(52) U.S. Cl.
CPC ......... *A47G 29/1216* (2013.01); *F16M 11/22* (2013.01)

(58) Field of Classification Search
CPC ... F16M 11/22; A47G 29/1216; Y10S 248/91; A63B 2071/026; E04H 12/2246
USPC ................ 232/39; 248/346.2, 910
See application file for complete search history.

(56) References Cited

U.S. PATENT DOCUMENTS

| | | | |
|---|---|---|---|
| 2,995,330 A | 8/1961 | Alms | |
| 4,588,123 A | 5/1986 | Plew | |
| 4,832,163 A * | 5/1989 | Levesque | A45B 3/00 108/14 |
| 5,022,618 A | 6/1991 | Barrett et al. | |
| 5,082,261 A * | 1/1992 | Pelfrey | A63B 71/023 473/483 |
| 5,207,377 A | 5/1993 | Brecht | |
| 5,678,757 A * | 10/1997 | Martin | A47G 29/1216 232/39 |
| 6,318,627 B1 | 11/2001 | Koebbe | |
| 6,513,284 B1 | 2/2003 | Sandlin | |
| 7,140,581 B1 | 11/2006 | White | |
| 7,614,600 B1 * | 11/2009 | Smith | G09F 23/00 248/910 |
| 10,582,795 B1 | 3/2020 | Rawls | |
| D919,282 S * | 5/2021 | Chen | D3/10 |
| 11,136,781 B1 * | 10/2021 | North | A47B 91/12 |

(Continued)

FOREIGN PATENT DOCUMENTS

WO 2007/097683 A1 8/2007

*Primary Examiner* — William L Miller
(74) *Attorney, Agent, or Firm* — Vorys, Sater, Seymour and Pease LLP; Mark A. Watkins

(57) ABSTRACT

A mailbox assembly that may be provided on a surface and freely movable by an end user from one location to another without digging a hole for the post. The mailbox assembly includes a post, a mail receptacle on an upper poste end, and a base on a lower base end. The base includes one or more hollow cavities for retaining ballast material to thereby move a center of gravity of the mailbox assembly towards the bottom surface, such that the mailbox can withstand 100 N of force applied perpendicular to the post without toppling. The post may also have one or more cavities for holding ballast material.

16 Claims, 7 Drawing Sheets

(56) References Cited

U.S. PATENT DOCUMENTS

2004/0056169 A1\* 3/2004 Harbaugh .......... E04H 12/2246
   248/910
2004/0222335 A1 11/2004 Panek, Jr.
2013/0061499 A1\* 3/2013 Berglund ................. G09F 1/00
   40/607.1
2017/0295978 A1\* 10/2017 Bihn .................. A47G 29/1216

\* cited by examiner

NO-DIG MAILBOX

CROSS-REFERENCE TO RELATED APPLICATIONS

The present application claims the benefit of and priority to U.S. Provisional Patent Application No. 62/939,362 filed on Nov. 22, 2019, which is hereby incorporated by reference in its entirety.

FIELD

The present disclosure relates to mailboxes.

BACKGROUND

Mailboxes are commonly erected alongside a road to facilitate the delivery of mail. They are often permanently and rigidly attached to posts buried into the ground. Often, a hole must be dug, which is time consuming and may be difficult or even impossible, depending on the terrain and surfaces involved. Relocating conventional mailboxes requires that another hole be dug, which may be particularly laborious if the location of the mailbox must be frequently adjusted, e.g., during construction. There exists a need for an improved mailbox that provides the utility of a roadside mailbox without the difficulties and limitations of commonly used mailboxes.

SUMMARY

The present disclosure relates to a mailbox. Specifically, a mailbox having a mailbox receptacle, a post with a top and bottom end, and a low, flat base having a hollow cavity in which to receive ballast material.

For example, a mailbox assembly comprising a post, a receptacle provided on the post, and a base provided at a bottom end of the post. The base has a bottom surface and one or more hollow cavities for retaining ballast material to thereby move a center of gravity of the mailbox assembly towards the bottom surface, such that the mailbox can withstand 100 N of force applied to the post without topping. A width of the base measurable along the bottom surface may be at least 1.5 times greater a distance between the center of gravity and the bottom surface to further enhance stability, such that the mailbox can withstand a threshold applied force perpendicular to the post without topping side to side and/or back to rear. In some embodiments, the mailbox assembly has enhanced stability in three hundred and sixty degrees about the post.

Also disclosed is a mailbox assembly comprising a post, a receptacle provided on the post, and a base provided at a bottom end of the post. The base has at least two separable parts that, when connected together, define a channel within which the bottom end of the post is securable. The at least two separable parts have one or more hollow cavities for retaining ballast material.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

The present disclosure provides a mailbox that does not require digging and that is easily transportable. Mailboxes are often required on rocky ground, hard clay, cement, concrete or other impenetrable landscapes. These same grounds may also be angled, such as on a hillside or slope. Occasionally there are circumstances underground that do not permit a post to be dug, such as piping, wiring, or other below ground complications. In other or the same situations, to dig a hole in the ground would require explosives, heavy machinery, or other extraordinary efforts that may be difficult, prohibited, or costly. Further, sometimes damage to the ground that would necessarily be incurred is forbidden, undesired, or unnecessary because the mailbox is to be only temporarily situated. In some situations, such as during construction projects, a mailbox must be relocated, sometimes frequently. Conventional mailboxes would require that multiple holes be dug to accommodate the changing mailbox positions. In still other cases, the mailbox owner has no ability or desire to bury the post of a mailbox, or otherwise easy installation and/or easy mobility is desired. The mailbox of the present disclosure does not require that a hole be dug.

Figure 1:
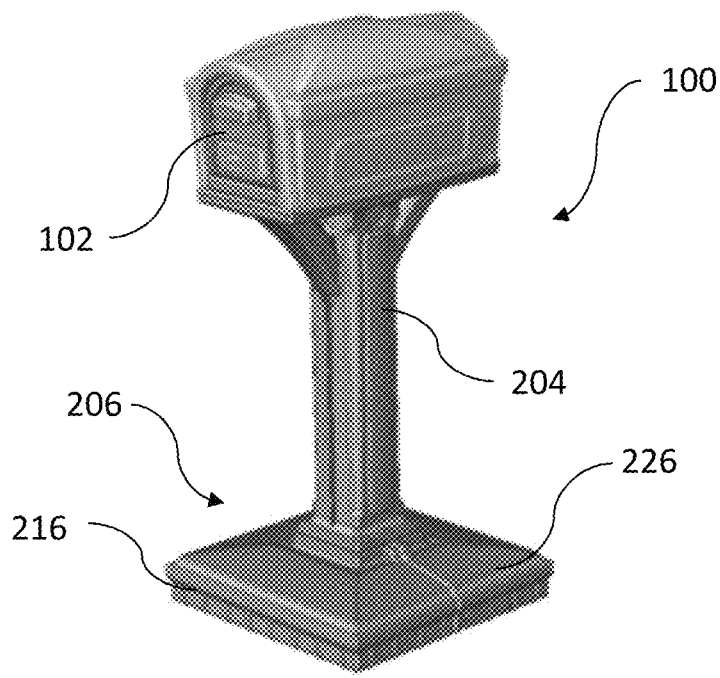
FIG. 1 is a perspective view of an embodiment of a mailbox of the present disclosure with separate post and base components.

FIG. 1 illustrates an exemplary mailbox assembly 100, according to one or more embodiments of the present disclosure. In the illustrated example, the mailbox assembly 100 includes a mail receptacle 102 (or simply "receptacle"), a post 204, and a base 206. Here, the mail receptacle 102 is provided on top of the post 204, which is situated on the base 206. Also in the illustrated example, the base 206 comprises two interlocking halves 216,226; however, the base 206 may instead be comprised of a unitary part or more than two part. The mailbox assembly 100 is constructed of a durable, rigid material, e.g., plastic or double walled plastic. The mailbox assembly 100 may be blow molded, injection molded and/or rotationally molded plastic.

In some embodiments, the upper portion of the mailbox is one of many, various conventional mail receptacle designs, for example those having a door that swings between a closed position and an open position to allow for mail to be placed into and removed from the mailbox. The mailbox may have a handle, or a raised or depressed portion to facilitate opening and closing of the door. The mailbox may have a flag to signal the presence of mail inside. The mailbox also may have additional features known in the art, such as a space for package and/or newspaper delivery, a place for numbers, and other conventional mailbox features and accruements. The mailbox may be integral with the post, or may interlock or otherwise connect with or fit onto the post (such as by means of a friction fit).

In other embodiments, the upper portion of the mailbox, the mailbox receptacle, is a delivery box or other container. Alternatively, the upper portion of the post may be formed into a shelf, or may have a shelf that interlocks or fits with the post, such as via a friction fit.

The upper portion of the mailbox, delivery box or other container is situated on a post, or is incorporated into the post so as to be positioned at a convenient or regulation height for mail carriers, couriers and other deliverymen, or any user.

The mailbox base has a hollow cavity for receiving ballast material, such as sand or water. The ballast material adds weight to the mailbox, to prevent the mailbox from moving undesirably. The post may be integral with the base, or it may fit into the base or otherwise interlock. In another embodiment, the mailbox base may be comprised of two identical or complimentary halves that lock around the mailbox post to lock the post between them. The halves may be held together with screws, bolts, clips, adhesive or other interlocking means, as is known in the art, or by adaptive means, such as male and female connectors, that cause the halves to be interconnecting. In some embodiments, the halves may be connected in a slidable, interlocking manner. Tongue and groove connectors may be distributed along the side walls of the halves such that each half fits to connect with the other. Each groove is indented into the side wall of the half facing the other section and formed to receive a tongue. The tongue is a raised, flat, or slightly rounded protrusion being formed on the wall of the half that faces the other section, which may be identically formed. Alternatively, one or more tongues could be formed on one half and one or more grooves on the other half. Regardless of the distribution pattern, the halves operate to interlock. Each half of the base may comprise a hollow cavity to receive ballast material, or the halves may work cooperatively to form an internal cavity. In other embodiments, the base is divided into more than two sections, such as three, four or more sections, that connect similarly to the halves, as discussed above, e.g., by interlocking means, tongue and groove connectors, etc.

In some embodiments, the base of the mailbox may hold, by way of example only, up to approximately 40 lbs (18 kg) of sand, or 40 lbs (18 kg) of sand in each half, so as to hold up to approximately 80 lbs (36 kg) in total. The post may also be hollow, and capable of receiving approximately 15 lbs (6.8 kg), or approximately 20 lbs (9 kg) of sand. Stakes may be used to promote stability and to assist the mailbox in remaining in position. Optionally, holes may be situated in the mailbox base to receive the one or more stakes. In an exemplary embodiment, the mailbox post is approximately 5.14 lbs (2.33 kg) and each half of the base is approximately 2.75 lbs (1.25 kg). The volume of the mailbox base cavity may be approximately 736 cubic inches (0.012 m$^3$). The dimensions of the mailbox may be 21" by 21" by 50.25", or 53⅓ cm by 53⅓ cm by 127.6 cm. The carton or mail receptacle situated on top of the post may how outside dimensions of approximately 1.2.5" by 21" by 39.5", or 31¾ cm by 53½ cm by 100½ cm.

In an exemplary embodiment, a mailbox is provided with a base post weighing approximately 8.25 lbs (3.74 kg). On top of the base post is a mailbox platform, weighing approximately 2.27 lb (1.03 kg), on which a mailbox receptacle, weighing approximately 4.50 lb (2.04 kg), may be arranged. The mailbox receptacle is removable from the post. The removable nature of the mailbox receptacle may be particularly advantageous if the mailbox is in a location where it might be struck by an object, such as a snowplow. The mailbox receptacle may be knocked off by an object without sustaining permanent damage, such that it may then be returned to the top of the post for continued use. The mailbox receptacle may optionally have two doors, and a designated area to which number decals may be affixed.

The post may be square, triangular or round in shape. It may be solid, or hollow, and may be configured to receive ballast material. In some embodiments, the post fits into a cavity of the mailbox base. In an exemplary embodiment, the base of the post may be configured to interconnect with the base of the mailbox such that sections of the mailbox base encircle or surround the post and prevent the post from being pulled through the mailbox base from the top or bottom.

In some embodiments, the hollow cavity of the post may be in fluid communication with cavities in the mailbox base, or with one or more cavities of the mailbox base sections. For example, some embodiments may comprise holes or apertures in the post that mate or align with corresponding holes in the mailbox base, or one or more mailbox base sections. In this way, the cavities of the post and the mailbox base or one or more mailbox base sections are in fluid communication with one another such that ballast material may be added to fill other parts of the assembly distant from the fill site.

Some embodiments comprise a 1-piece post and mailbox, or an integral post and mailbox that features a large cavity in the bottom to be filled with a ballast material, such as sand. No digging is required to position the mailbox so that it remains fixed in position under typical conditions.

Some embodiments feature a post with a base upon which weights filled with a ballast material may be positioned. In other embodiments, the weights may be solid, such as concrete blocks, solid metal weights, and the like as would be known to one skilled in the art.

Turning now to the figures, FIG. 1 shows a perspective view of an exemplary mailbox 100 of the present disclosure, with a mail receptacle 102 on top of a post 204, and the post situated atop two interlocking halves 216,226 forming the mailbox base 206.

Figure 2:
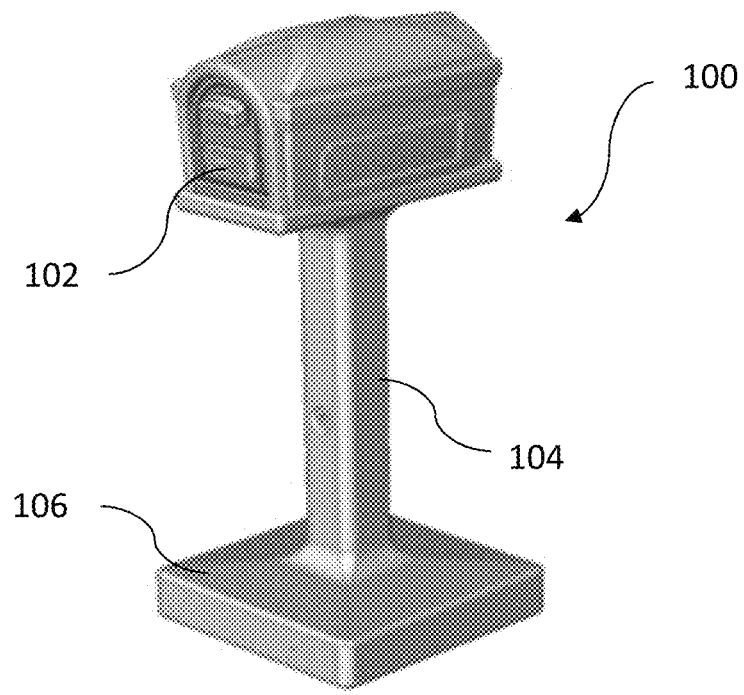
FIG. 2 is a perspective view of an embodiment of a mailbox of the present disclosure with integral post and mailbox base.

FIG. 2 is a perspective view of a mailbox 100 of the present disclosure, with a mail receptacle 102 on top of an integral post 104 that is integral with the integral mailbox base 106.

Figure 3:
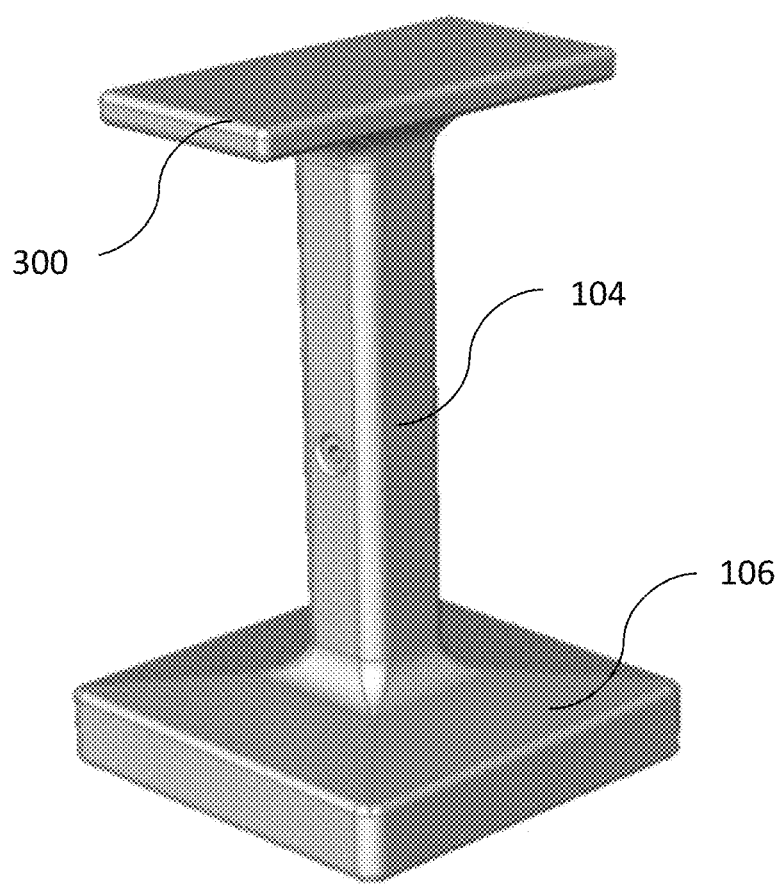
FIG. 3 is a perspective view of a unitary post and base of a mailbox of the present disclosure with a shelf.

FIG. 3 is a perspective view of a unitary mailbox of the present disclosure, with a shelf 300 integral with the post 104 which is integral with the integral mailbox base 106.

Figure 4:
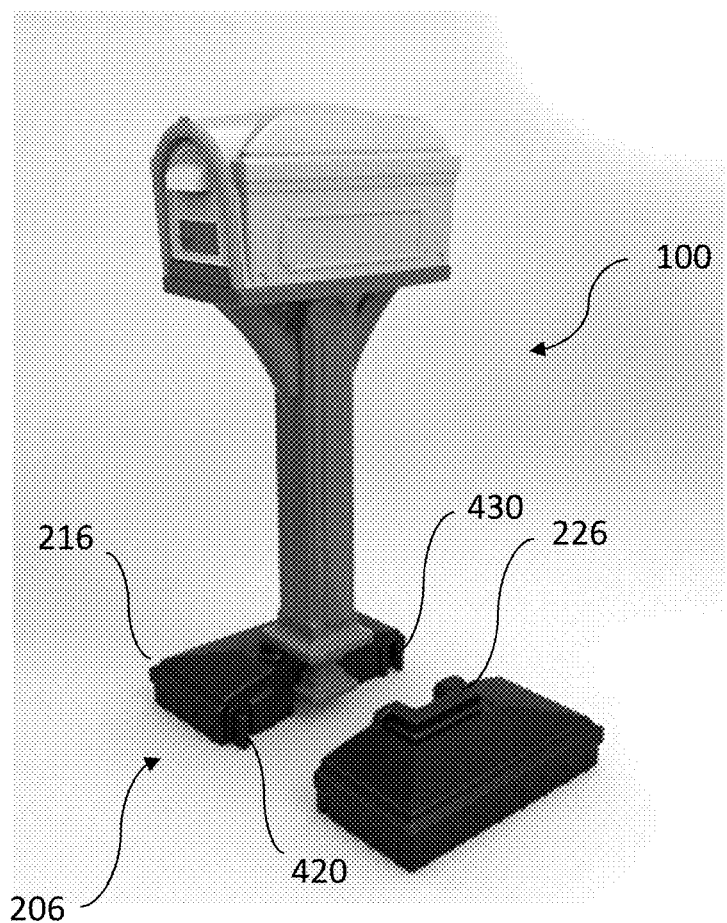
FIG. 4 is a perspective view of a mailbox with a two-part, separated base with the interlocking halves separated.

FIG. 4 is a perspective view of an embodiment of a mailbox 100 the present disclosure with two interlocking halves 216,226 forming the mailbox base 206. The side walls 410 of the halves that face the other section have interlocking or complimentary geometries. Shown is a tongue 420 and a groove 430 that fit together with corresponding grooves and tongue on the opposite half.

Figure 5:
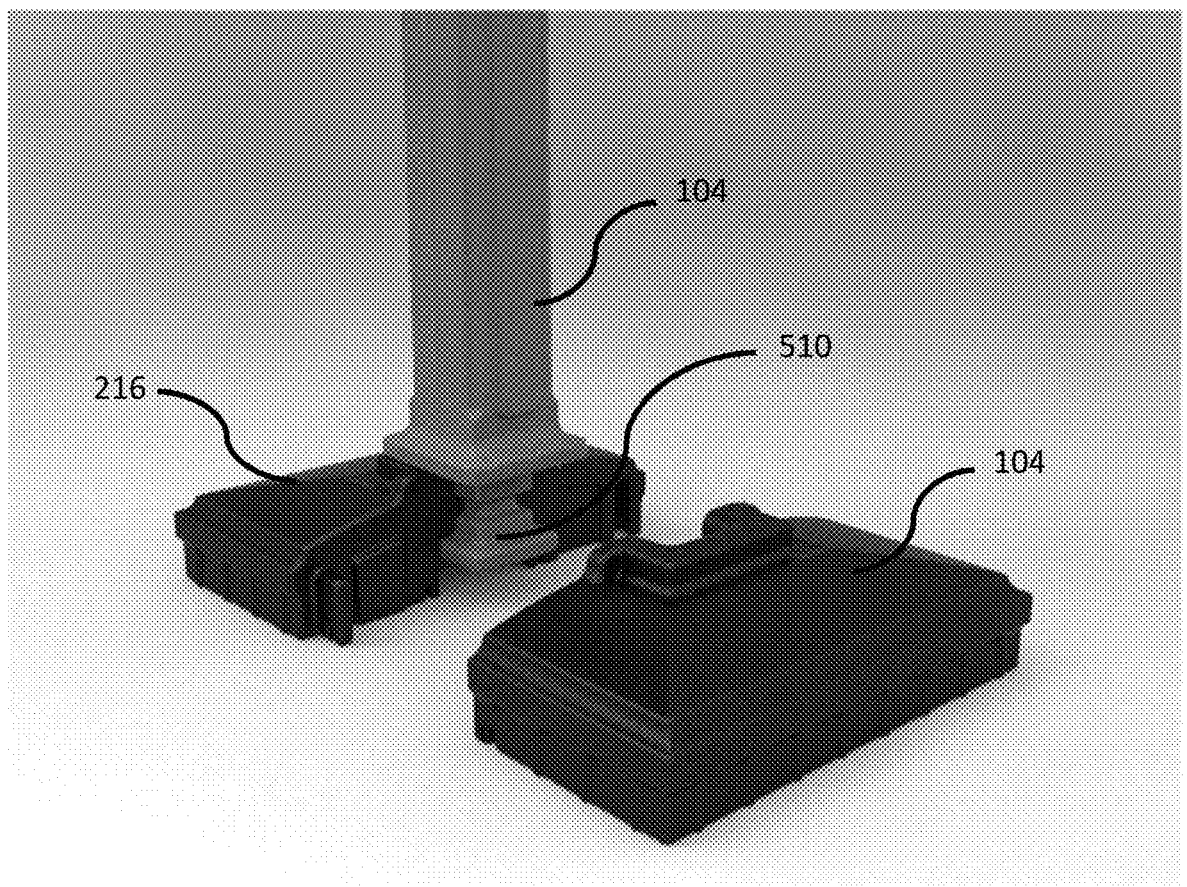
FIG. 5 is an enlarged view of a mailbox with a two-part, separated base showing the interlocking halves separated.

FIG. 5 is a close-up view of FIG. 4 showing the unassembled interlocking halves 216,226 of the mailbox base and a mailbox post 204. The post has a flange 510 that may be stepped. The interior of the halves of the mailbox base 206 have corresponding geometries or stepped surface to interlock and retain the bottom end of the post therein when they are assembled together around the bottom end of the post. Configured thusly, the post 204 is unable to be removed by pulling from the top or bottom of the post without disassembling the mailbox base or destroying the mailbox. In an alternate embodiment, the bottom end of the post may fit within a channel in the mailbox base.

Figure 6:
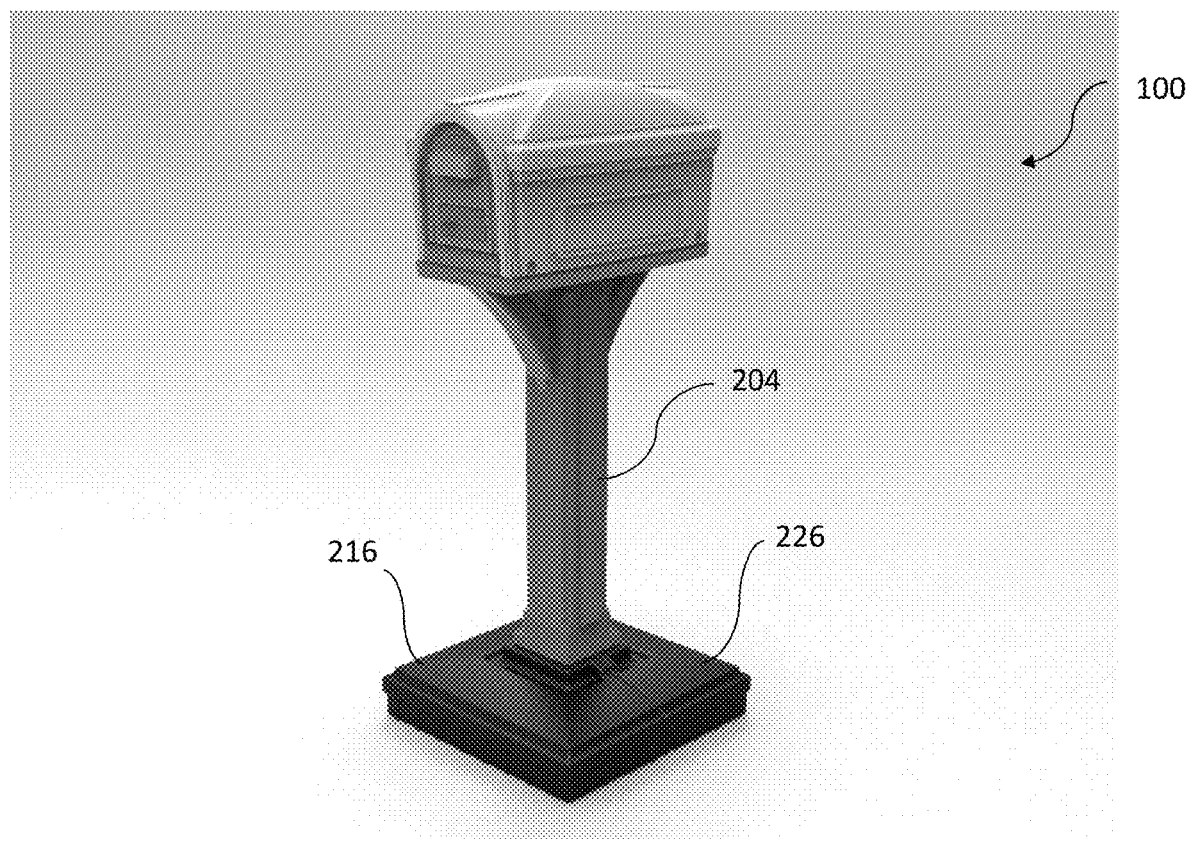
FIG. 6 is a perspective view of a mailbox of the present disclosure with interlocking halves of the base enclosing a post.

FIG. 6 is a perspective view of a mailbox 100 with two halves of a mailbox base 216,226 enclosing the mailbox post 204.

Figure 7:
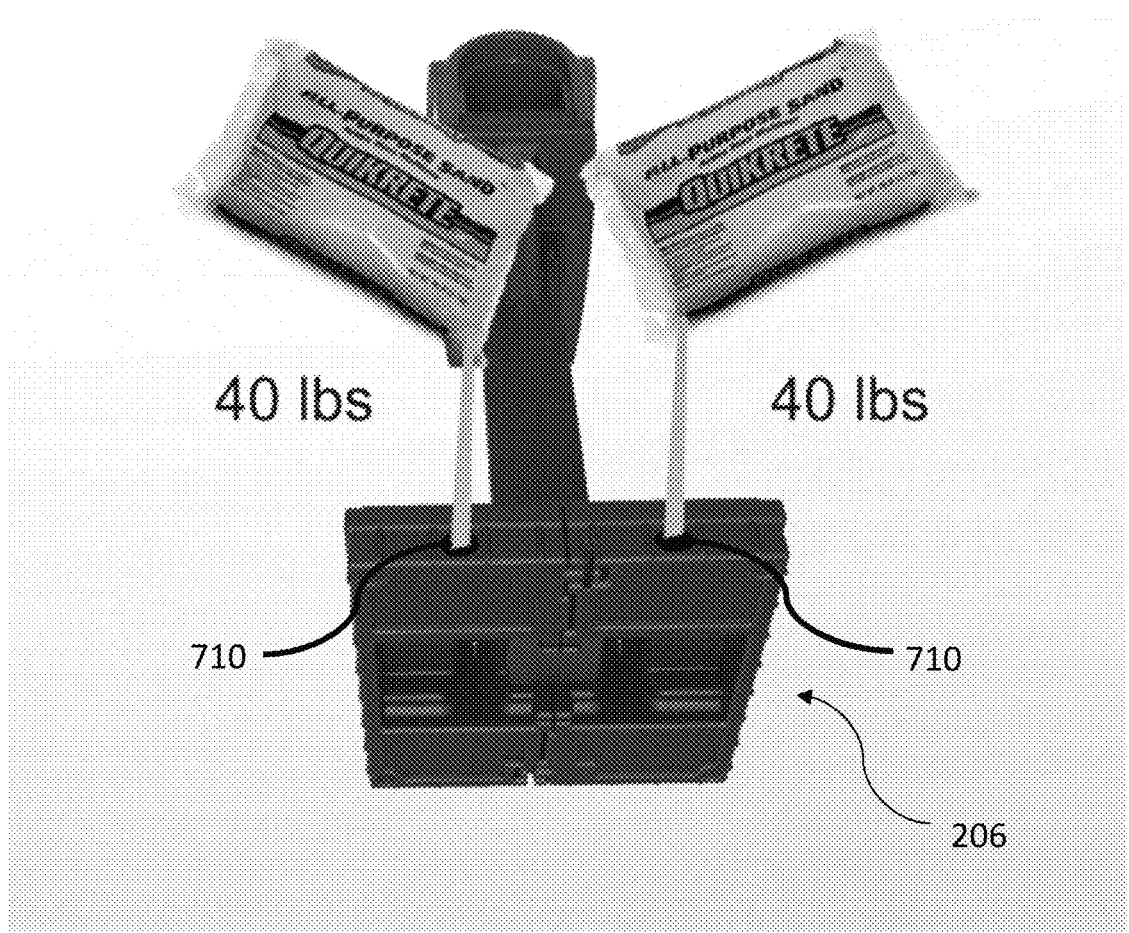
FIG. 7 is a bottom perspective view of a mailbox base being filled with ballast material.

FIG. 7 is an exploded view of a mailbox of the present disclosure showing ballast materials being poured into a mailbox base 206 via fill holes 710. The fill holes open into cavities within the base and are in fluid communication with at least one of the cavities to permit filling of the hollow cavity with ballast material. FIG. 7 shows the fill holes 710 on one side of each of two halves of a mailbox base opening into hollow cavities within the halves, but the fill holes may be provided elsewhere on the mailbox assembly instead or in addition to what is illustrated in FIG. 7. For example, one fill hole may correspond with each of any number of hollow cavities within the mailbox base. In addition or alternatively, one or more fill holes may be provided on the post. Also, the mailbox receptacle may be removed from the post to expose an open end of the post through which ballast material may be poured or inserted in order to fill or partially fill the base and/or post.

Figure 8A:
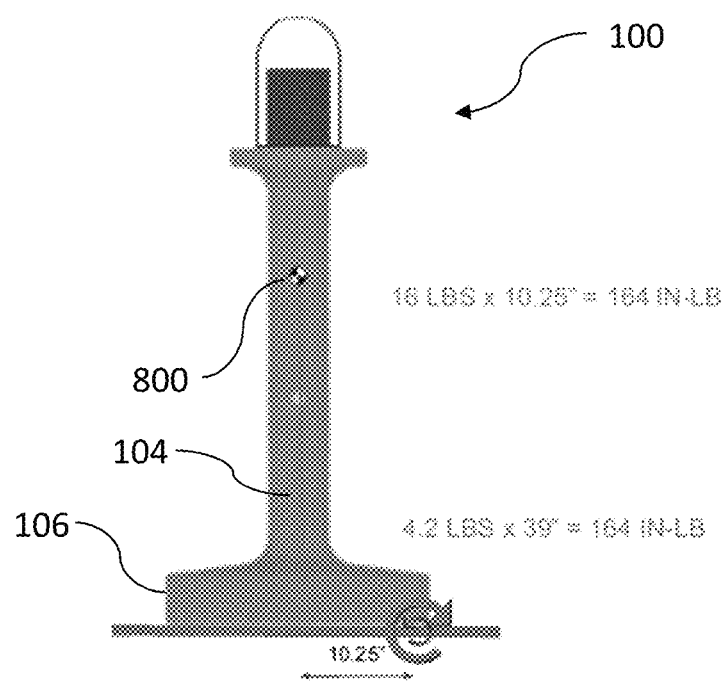
FIG. 8*a* is a view of a mailbox without ballast material and with a high center of gravity.

FIG. 8a is a front view of a mailbox 100 of the present disclosure showing an integral post 104 and integral base 106 empty of ballast material, consequently the center of gravity 800 is high. A high center of gravity is above the mid-way point of the entire height of the mailbox, or above the mid-way point of the height of the post and base.

Figure 8B:
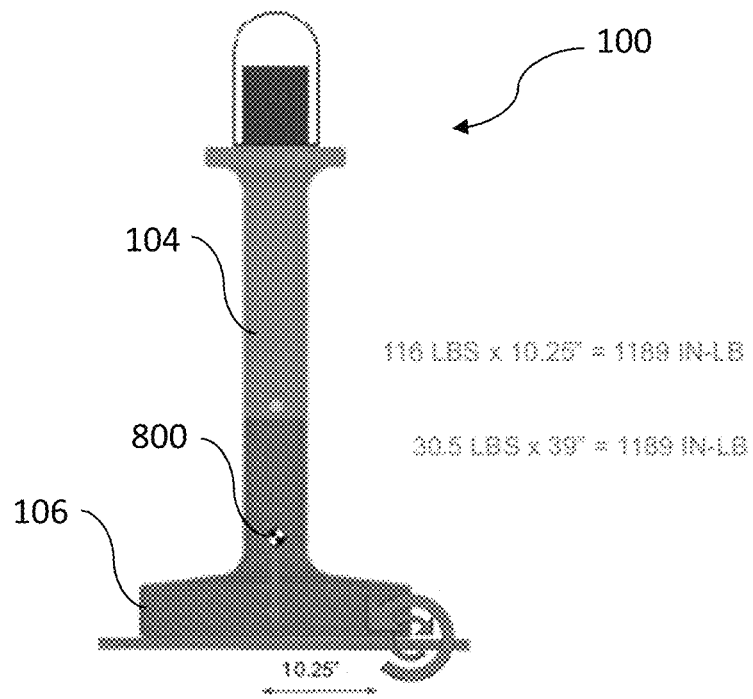
FIG. 8*b* shows a mailbox with ballast material and with a low center of gravity.

FIG. 8b is a front view of a mailbox 100 of the present disclosure showing an integral post 104 and integral base 106 partially filled with ballast material, consequently the center of gravity 800 is low. A low center of gravity is below the mid-way point of the entire height of the mailbox, or below the mid-way point of the height of the post and base, or is located in the base of the mailbox, or is situated just above the mailbox base.

Mailbox assemblies according to the present disclosure may withstand applied forces, side to side and front/back to back/front, such that the mailbox assembly has 360 degree stability. Such applied forces may be those that may be experienced in use, for example, via wind, or other forces that may occur when the mailbox assembly is installed in a neighborhood setting. When ballast material is introduced to the hollow core of the one or more parts of the mailbox base and/or the post of the mailbox, or to the integral post/base structure, the center of gravity of the mailbox is lowered so as to impart stability to, and enhance stability of, the mailbox such that the mailbox assembly may withstand even larger forces applied to the box without toppling over (sideways or front to back). When certain conditions are not met, the amount of force withstandable by the mailbox assembly may be diminished (i.e., less force may be applied to topple the mailbox assembly if certain conditions are not met). For example, the mailbox assembly may be toppled via less applied force if, for example, the mailbox assembly is not filled with ballast material, is not fully filled with ballast material, the mailbox assembly is provided on an inclined/sloped surface, the post is not fully secured within the base, etc. Thus, when fully filled with a ballast material and provided on a flat surface, the mailbox assembly may withstand a maximum applied force, where applied forces above that maximum would cause toppling. It will be appreciated, however, applied forces above such maximum are rarely encountered outside acts of gods (severe weather) or unanticipated/unintended accidents (vandalism, car or bicycle crashing into it, etc.). In embodiments where ballast material may be provided within a cavity in the post, adding ballast material within the post in addition to the base will help lower the center of gravity and thereby increase stability. However, providing the mailbox assembly on a sloped surface may decrease the center of gravity such that, adding too much ballast material (i.e., above a certain height/level) may actually raise the center of gravity and thereby enhance instability (or destabilize) the mailbox assembly. Thus, where the mailbox assembly is to be provided on a sloped surface, ballast material may be provided solely in the base or in both the base and in the post cavity but only up to a height (vertical dimension from normal) in the post cavity that does not result in raising (or moving upward) the center of gravity. For example, where the mailbox assembly is provided on a sloped surface, less ballast material may be provided within the post (i.e., to a lower level therein) than as compared to if the mailbox assembly were provided on a flat surface. In one example of the mailbox assembly provided on a sloped surface, ballast material is fillable within the post only up to a height (vertical dimension from flat surface) corresponding to the center of gravity of the mailbox assembly calculated when the base cavity is filled with ballast material, such that adding additional ballast material within the post does not result in raising the center of gravity and destabilizing the mailbox assembly.

The mailbox itself may be low in weight so as to be easily transported, shipped and carried into place, for example, approximately 15 lbs or approximately 7 kg, or, absent the mailbox top, approximately 11 lbs or approximately 5 kg. The angle of the post is perpendicular to the angle of the site upon which the mailbox is situated. Alternatively, the post may be angled for sloped applications. In some embodiments, the total base width is greater than approximately three times the width of the mailbox post. In other embodiments, the total base width is greater than approximately five times the width of the mailbox post. In some embodiments, the height from the ground to the center of gravity of the mailbox is approximately 8 inches (20 cm), while the width of the mailbox base is approximately 21 inches (53 cm). The ratio of the height of the center of gravity to the width of the base may be approximately 0.38:1, or approximately 0.4:1, or approximately 0.5:1; or approximately 0.57:1, or approximately 0.6:1, or approximately 0.7:1, or approximately 0.8:1, or approximately 0.9:1, or at most 0.9:1, or at most 1:1. Or the width of the base measureable along the bottom surface of the mailbox base may be at least 1.5 times greater than the distance from the ground to the center of gravity of the mailbox, or it may be approximately at least 2 times greater, or approximately at least 2.5 times greater, or approximately at least 2.6 times greater, or approximately at least 3 times greater, or approximately at least 3.5 times greater, or approximately at least 5 times greater.

When approximately 100 lbs (45 kg) of ballast material is contained in the hollow core of the one or more parts of the mailbox base and/or mailbox post, or integral base, the force required to topple the mailbox when applied parallel to a flat surface at a height of approximately 39 inches (99 cm) is increased from approximately 4.2 pounds of force (18.7 N) required to topple the mailbox to approximately 30.5 pounds of force (136 N), an increase of more than 7 times of the force required to topple the mailbox. The force may be applied from one side of the mailbox, or from the front or from the rear of the mailbox, or diagonally. For example, the force may be from a vehicle driving into the mailbox from any angle of approach largely parallel to the surface upon which the mailbox is placed, or largely perpendicular to the mailbox post.

Thus, the mailbox of the present disclosure may require between about 65 N and about 175 N of force applied parallel to the ground at a height of approximately 1 m to topple, or between about 75 N and about 150 N, or about 90 N to about 150 N, or about 105 N to about 140 N, or about 115 N to about 135 N, or about 130 N, or about 135 N of force, or at least 100 N of force, or at least 130 N of force, or up to 100 N of force, or up to 130 N of force, and amounts disclosed in between.

Thus, one aspect of the present invention is to provide a mailbox requiring no digging (a "no-dig mailbox" or "dig-free mailbox") that is resistant to toppling, the base being substantially wider than the post and the base and/or post being hollow in order to receive ballast material.

Another aspect of the invention is a method of manufacturing a mailbox requiring no digging that is resistant to toppling, comprising the steps of: introducing thermoplastic synthetic resin into a mold; forming the resin into one or more hollow mailbox components, e.g., mailbox bases, a mailbox post, and a mailbox top, or an integral one-piece mailbox comprising a base, post and top (or shelf); cooling the mailbox components; and removing the mailbox components from the mold.

Yet another aspect of the invention is a method of use of a no-dig mailbox that is resistant to toppling, comprising the steps of obtaining hollow mailbox components, installing them on a site such as near a road or drive, and filling one or more of the hollow components with ballast material such as water or sand. In some embodiments, water is used as a ballast material in combination with an anti-freeze agent. In some embodiments, the ballast material is cement.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A mailbox assembly comprising:
  a post;
  a receptacle provided on the post; and
  a base provided at a bottom end of the post, the base having a bottom surface and one or more hollow cavities for retaining ballast material to thereby move a center of gravity of the mailbox assembly towards the bottom surface, wherein a width of the base measurable along the bottom surface of the base is at least 1.5 times greater than a distance between the bottom surface and a center of gravity of the mailbox assembly such that the mailbox assembly can withstand 100 N of force applied perpendicular to the post without toppling, wherein the base further comprises:
  a first and second part that, when connected together, define a channel within which the bottom end of the post is mountable, wherein the first part and the second part are separable from each other to expose a first and second interlocking face, respectively, the first and second interlocking face at least partially defining the channel when in contact with each other.

2. The mailbox assembly of claim 1, wherein, upon separating the first and second parts, the bottom end of the post is positionable in or removable from a portion of the channel defined in the first or second interlocking face.

3. The mailbox assembly of claim 1, wherein the first and second interlocking face are transverse to the bottom surface.

4. The mailbox assembly of claim 1, wherein the first and second interlocking face have complimentary shapes such that they may be connected together.

5. The mailbox assembly of claim 1, wherein the post, the receptacle, and the base together weigh approximately 16 pounds.

6. The mailbox assembly of claim 5, wherein the one or more hollow cavities is sized to retain approximately 100 pounds of ballast material.

7. The mailbox assembly of claim 1, wherein the post is integral with the receptacle.

8. The mailbox assembly of claim 1, wherein the post includes a hollow cavity for retaining ballast material.

9. The mailbox assembly of claim 8, wherein the hollow cavity of the post is in fluid communication with at least one of the one or more hollow cavities of the base.

10. A mailbox assembly comprising:
  a post;
  a receptacle provided on the post; and
  a base provided at a bottom end of the post, the base having at least two separable parts that, when connected together, define a channel within which the bottom end of the post is securable, wherein the at least two separable parts having one or more hollow cavities for retaining ballast material, wherein separating the first part from the second part exposes a first and second interlocking face, respectively, the first and second interlocking face at least partially defining portions of the channel.

11. The mailbox assembly of claim 10, wherein a width of the base measurable along a bottom surface of the base is at least 1.5 times greater than a distance between the bottom surface and a center of gravity of the mailbox assembly such that the mailbox assembly can withstand 100 N of force applied perpendicular to the post without toppling.

12. The mailbox assembly of claim 10, wherein, upon separating the first and second parts, the bottom end of the post is positionable in or removable from the portion of the channel defined in the first or second interlocking face.

13. The mailbox assembly of claim 10, wherein the first and second interlocking face are transverse to a bottom surface of the base.

14. The mailbox assembly of claim 10, wherein the first and second interlocking face have complimentary shapes such that they may be connected together.

15. The mailbox assembly of claim 10, wherein the post includes a hollow cavity for retaining ballast material.

16. The mailbox assembly of claim 15, wherein the hollow cavity of the post is in fluid communication with at least one of the one or more hollow cavities of the base.

* * * * *